(12) United States Patent
Xie et al.

(10) Patent No.: US 8,239,428 B2
(45) Date of Patent: Aug. 7, 2012

(54) METHOD FOR COPYING DATA FROM SOURCE HARD DRIVE TO TARGET HARD DRIVE

(75) Inventors: Qiu-Gui Xie, Shenzhen (CN); Gang Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 151 days.

(21) Appl. No.: 12/868,742

(22) Filed: Aug. 26, 2010

(65) Prior Publication Data

US 2011/0295810 A1 Dec. 1, 2011

(30) Foreign Application Priority Data

May 31, 2010 (CN) .......................... 2010 1 0187247

(51) Int. Cl.
*G06F 17/30* (2006.01)

(52) U.S. Cl. ........................................ 707/823; 707/679

(58) Field of Classification Search ................... 707/832
See application file for complete search history.

(56) References Cited

U.S. PATENT DOCUMENTS 5,974,567 A * 10/1999 Dickson et al. ................. 714/27
2007/0027933 A1 * 2/2007 Lavin et al. ................... 707/202

* cited by examiner

*Primary Examiner* — Thu-Nguyet Le
(74) *Attorney, Agent, or Firm* — Altis Law Group, Inc.

(57) ABSTRACT

A method for copying data from a source hard drive to a target hard drive is implemented in an electronic device. The source hard drive stores a master boot record (MBR) recording a SYSTEM partition and at least one other partition. The electronic device copies information related to the SYSTEM partition to a file to store in the source hard drive and modifies the MBR to be a modified MBR by erasing the SYSTEM partition. The electronic device then creates a diagnostic sub-partition for system diagnostics in one of the at least one other partition, copies the file to the diagnostic sub-partition, and copies the modified MBR in the target hard drive. When the system diagnostics is implemented for the target hard drive, the electronic device restores the SYSTEM partition in the target hard drive based on the file.

9 Claims, 3 Drawing Sheets

METHOD FOR COPYING DATA FROM SOURCE HARD DRIVE TO TARGET HARD DRIVE

BACKGROUND

1. Technical Field

The present disclosure relates to a method for copying data from a source hard drive to a target hard drive.

2. Description of Related Art

PC manufacturers copy operating system (OS) image files from a source hard drive to a plurality of target hard drives for mass production using a hard drive copy machine. Commonly, after the OS is installed, the source hard drive is divided into RECOVERY, OS, and DATA partitions. The PC manufacturers further create a diagnostic partition in the source hard drive to store a diagnostics image used for system diagnostics.

However, when the WINDOWS 7 OS is installed, the source hard drive is divided into four partitions, the RECOVERY partition, the OS partition, the DATA partition as before, and an additional SYSTEM partition. The hard drive copy machine copies only four partitions from the source hard drive to the target hard drive. As a result, the PC manufacturers are unable to further create the diagnostic partition in the source hard drive.

DETAILED DESCRIPTION

In general, the word "module" as used herein, refers to logic embodied in hardware or firmware, or to a collection of software instructions, written in a programming language, such as, for example, Java, C, or assembly. One or more software instructions in the unit may be integrated in firmware, such as an EPROM. It will be appreciated that module may comprise connected logic units, such as gates and flip-flops, and may comprise programmable units, such as programmable gate arrays or processors. The unit described herein may be implemented as either software and/or hardware unit and may be stored in any type of computer-readable medium or other computer storage device.

Figure 1:
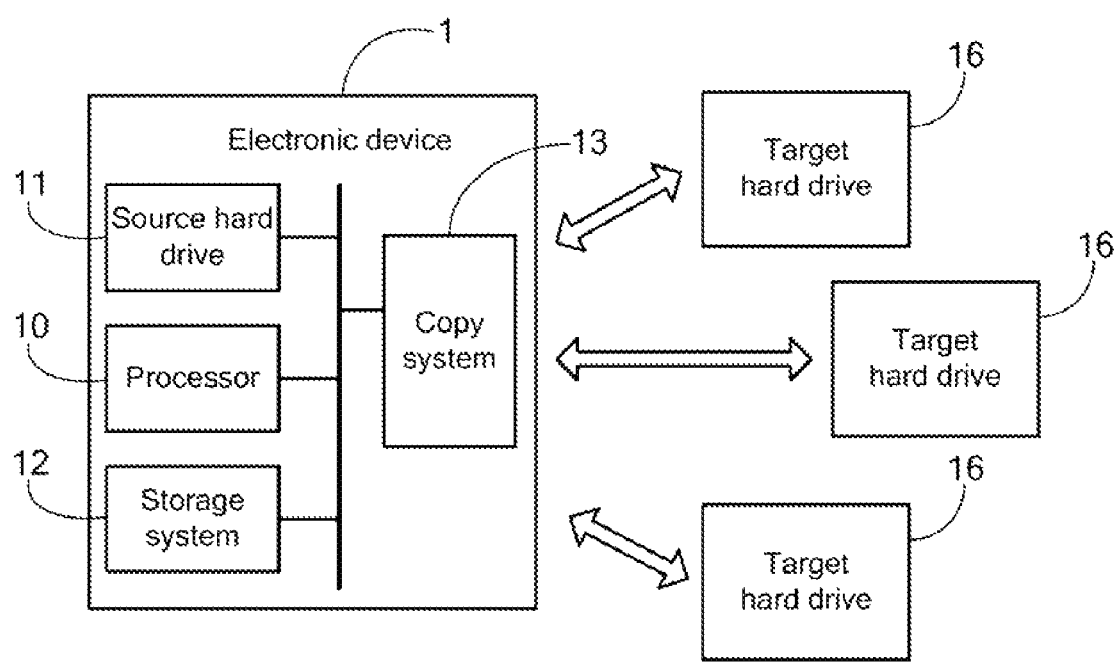
FIG. 1 is a block diagram of one embodiment of an electronic device.

FIG. 1 is a block diagram of one embodiment of an electronic device 1. The electronic device 1 may be a PC or a hard drive copying machine, for example. The electronic device 1 includes a processor 10, a source hard drive 11, a storage system 12, and a copy system 13. The processor 10 may execute one or more programs stored in the storage system 12 to provide functions for the source hard drive 11 and the copy system 13. The electronic device 1 is capable of electronically connecting with at least one target hard drive 16 and copying data from the source hard drive 11 to the target hard drive 16. In the embodiment, the electronic device 1 electronically connects with three target hard drives 16, but the present disclosure is not limited thereto.

The electronic device 1 is generally controlled and coordinated by an operating system, such as UNIX, Linux, Windows, Mac OS, an embedded operating system, or any other compatible system. Alternatively, the electronic device 1 may be controlled by a proprietary operating system. Typical operating systems control and schedule computer processes for execution, perform memory management, provide file system, networking, and I/O services, and provide a user interface, such as a graphical user interface (GUI), among other tasks.

After the operating system is installed in the source hard drive 11, a master boot record (MBR) is generated in the source hard drive 11. The MBR is a 512-byte boot sector that is the first sector of the source hard drive 11. In the embodiment, the operating system is WINDOWS 7, so the source hard drive 11 is divided into a RECOVERY partition, a SYSTEM partition, an OS partition, and a DATA partition. The RECOVERY partition is operable to store recovery data. The SYSTEM partition is created by WINDOWS 7 to store system files. The OS partition is operable to hold the operating system. The DATA partition is reserved for user access. The MBR includes a partition table recording the RECOVERY partition, the SYSTEM partition, the OS partition, and the DATA partition.

Figure 2:
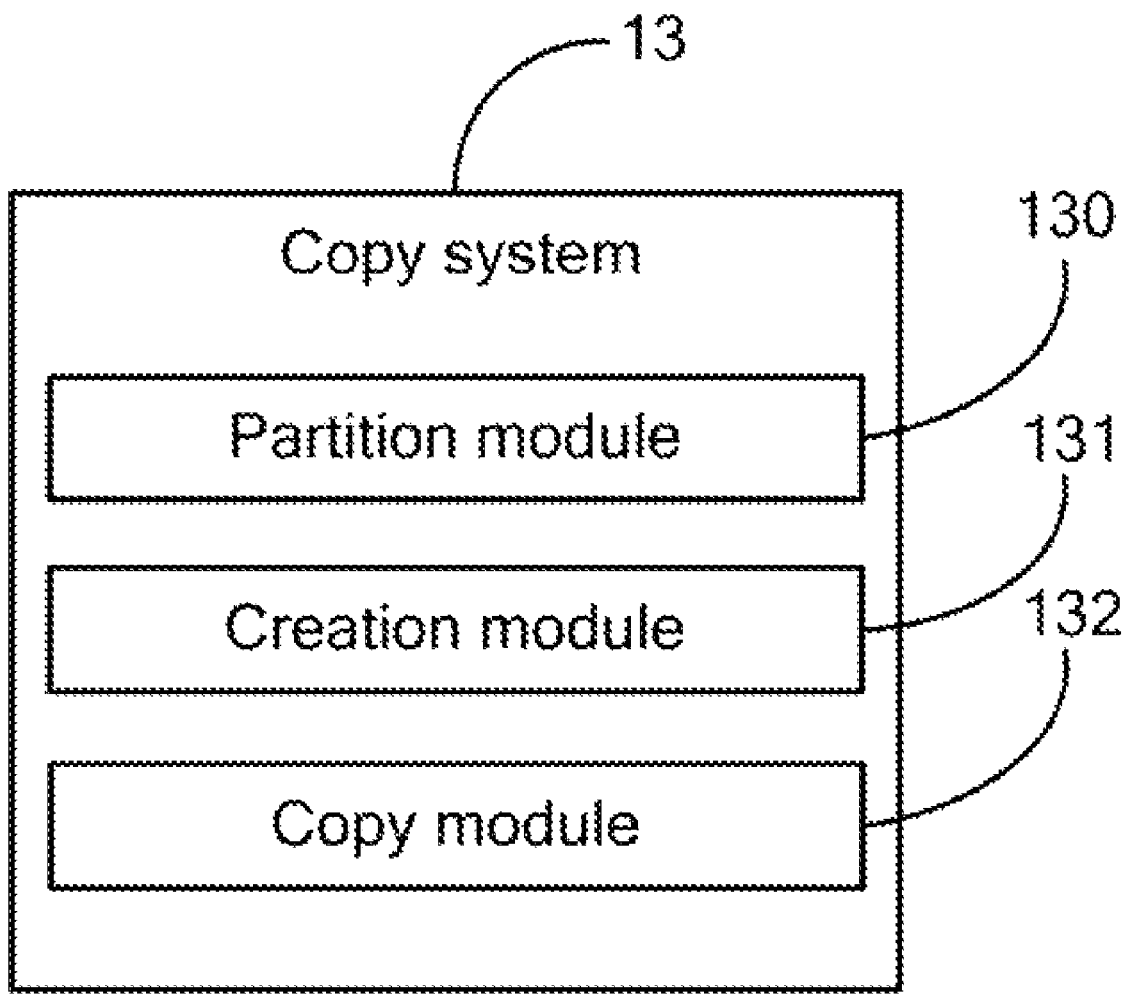
FIG. 2 is a block diagram of one embodiment of a copy system of the electronic device of FIG. 1.

FIG. 2 is a block diagram of one embodiment of the copy system 13 of the electronic device 1 of FIG. 1. The copy system 13 includes a partition module 130, a creation module 131, and a copy module 132. The partition module 130 is operable to modify the MBR to be a modified MBR by erasing the SYSTEM partition in the source hard drive 11. The creation module 131 is operable to create a diagnostic sub-partition in the DATA partition of the source hard drive 11. The diagnostic sub-partition stores a diagnostics image used for system diagnostics during production. The system diagnostics is a software procedure for testing PC related hardware. The copy module 132 is operable to copy information related to the SYSTEM partition to a file to store in the source hard drive 11, copy the file to the diagnostic sub-partition, and copy the modified MBR to the target hard drive 16. The creation module 131 restores the SYSTEM partition in the target hard drive 16 based on the file when the system diagnostics is implemented for the target hard drive 16.

Figure 3:
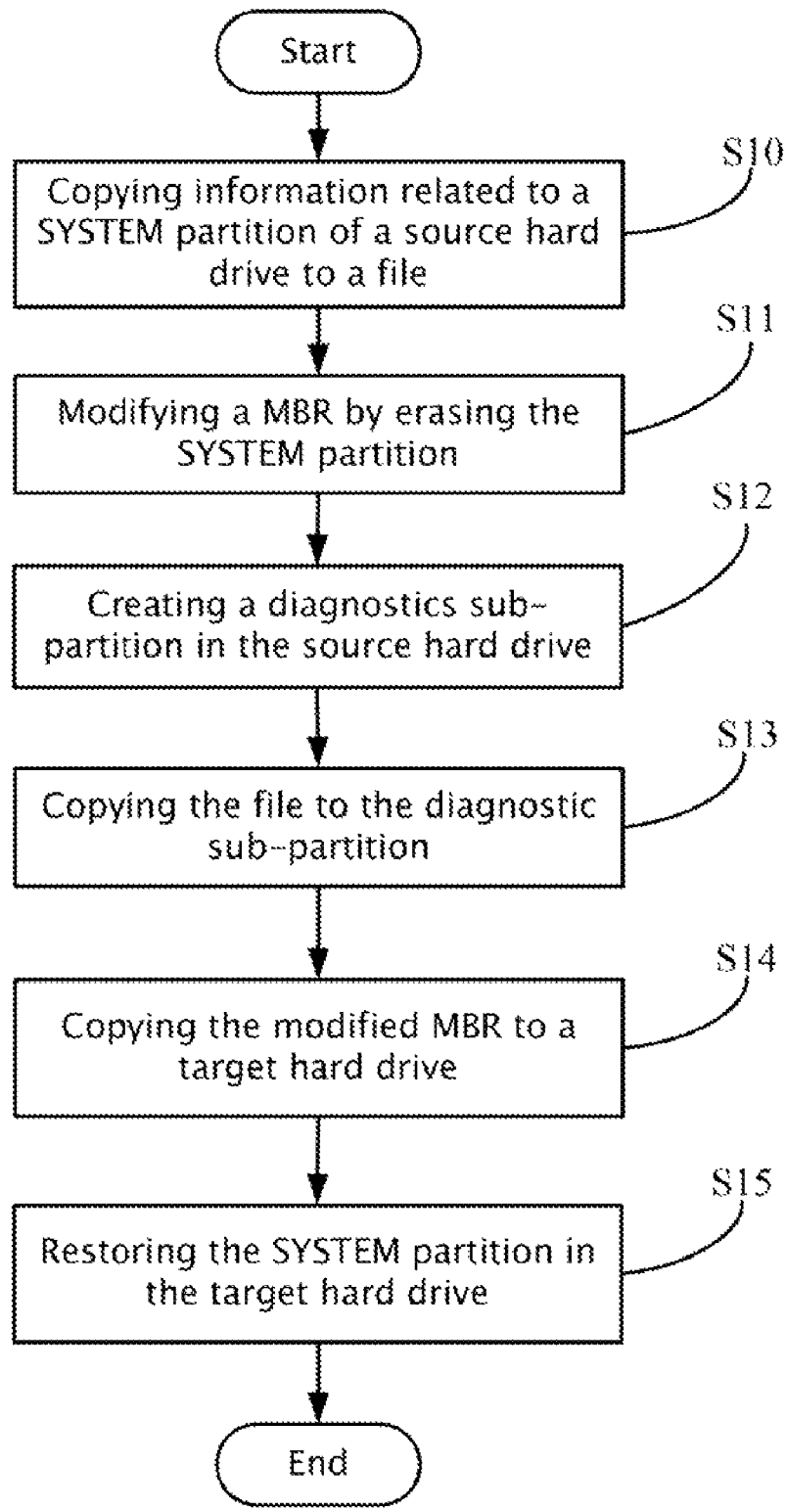
FIG. 3 is a flowchart illustrating one embodiment of a method for copying data from a source hard drive to a target hard drive.

FIG. 3 is a flowchart illustrating one embodiment of a method for copying data from the source hard drive 11 to the target hard drive 16. Depending on the embodiment, additional blocks in the flow of FIG. 3 may be added, others removed, and the ordering of the blocks may be changed.

In block S10, the copy module 132 copies the information related to the SYSTEM partition to the file to store in the source hard drive 11.

In block S11, the partition module 130 modifies the MBR to be the modified MBR by erasing the SYSTEM partition.

In block S12, the creation module 131 creates the diagnostic sub-partition for the system diagnostics in the DATA partition.

In block S13, the copy module 132 copies the file to the diagnostic sub-partition.

In block S14, the copy module 132 copies the modified MBR to the target hard drive 16.

In block S15, the creation module 131 restores the SYSTEM partition in the target hard drive 16 based on the file when the system diagnostics is implemented for the target hard drive 16.

The present disclosure provides a method for copying WINDOWS 7 installed in a source hard drive to a target hard drive. Operating system installation of the target hard drive is improved.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method for copying data from a source hard drive to a target hard drive, wherein the source hard drive stores a master boot record (MBR) recording a SYSTEM partition and at least one other partition, the method comprising:
    copying information related to the SYSTEM partition to a file to store in the source hard drive;
    modifying the MBR to be a modified MBR by erasing the SYSTEM partition;
    creating a diagnostic sub-partition for system diagnostics in one of the at least one other partition;
    copying the file to the diagnostic sub-partition;
    copying the modified MBR to the target hard drive; and
    restoring the SYSTEM partition in the target hard drive based on the file when system diagnostics is implemented for the target hard drive.

2. The method of claim 1, wherein the at least one partition comprises a RECOVERY partition, an OS partition, and a DATA partition.

3. The method of claim 2, wherein the one of the at least one partition is the DATA partition.

4. An electronic device capable of copying data from a source hard drive to a target hard drive, wherein the source hard drive storing a master boot record (MBR) recording a SYSTEM partition and at least one other partition, the electronic device comprising:
    a storage system;
    at least one processor;
    one or more programs stored in the storage system and being executable by the at least one processor;
    a partition module operable to modify the MBR to be a modified MBR by erasing the SYSTEM partition;
    a creation module operable to create a diagnostic sub-partition for system diagnostics in one of the at least one other partition;
    a copy module operable to copy information related to the SYSTEM partition to a file to store in the source hard drive, copy the file to the diagnostic sub-partition, and copy the modified MBR to the target hard drive; and
    wherein the creation module restores the SYSTEM partition in the target hard drive based on the file when the system diagnostics is implemented for the target hard drive.

5. The electronic device of claim 4, wherein the at least one other partition comprises a RECOVERY partition, an OS partition, and a DATA partition.

6. The electronic device of claim 5, wherein the one of the at least one other partition is the DATA partition.

7. A storage medium having stored thereon instructions that, when executed by a processor, causing the processor to perform a method for copying data from a source hard drive to a target hard drive, wherein the source hard drive stores a master boot record (MBR) recording a SYSTEM partition and at least one other partition, wherein the method comprises:
    copy information related to the SYSTEM partition to a file to store in the source hard drive;
    modify the MBR to be a modified MBR by erasing the SYSTEM partition;
    create a diagnostic sub-partition for system diagnostics in one of the at least one other partition;
    copy the file to the diagnostic sub-partition;
    copy the modified MBR to the target hard drive; and
    restore the SYSTEM partition in the target hard drive based on the file when system diagnostics is implemented for the target hard drive.

8. The storage medium of claim 7, wherein the at least one partition comprises a RECOVERY partition, an OS partition, and a DATA partition.

9. The storage medium of claim 8, wherein the one of the at least one partition is the DATA partition.

* * * * *